(12) United States Patent
Ji et al.

(10) Patent No.: US 10,175,812 B2
(45) Date of Patent: Jan. 8, 2019

(54) ELIMINATION METHOD OF PARASITIC CAPACITANCE AND DEVICE

(71) Applicant: Wuhan China Star Optoelectronics Technology Co., Ltd., Wuhan, Hubei (CN)

(72) Inventors: Feilin Ji, Guangdong (CN); Xiaoping Tan, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 163 days.

(21) Appl. No.: 15/300,254

(22) PCT Filed: Aug. 12, 2016

(86) PCT No.: PCT/CN2016/094894
§ 371 (c)(1),
(2) Date: Sep. 28, 2016

(87) PCT Pub. No.: WO2018/023831
PCT Pub. Date: Feb. 8, 2018

(65) Prior Publication Data
US 2018/0173359 A1    Jun. 21, 2018

(30) Foreign Application Priority Data

Aug. 3, 2016  (CN) .......................... 2016 1 0628812

(51) Int. Cl.
*G06F 3/041* (2006.01)
*G02F 1/1333* (2006.01)
(Continued)

(52) U.S. Cl.
CPC .......... *G06F 3/0416* (2013.01); *G02F 1/1333* (2013.01); *G06F 3/044* (2013.01);
(Continued)

(58) Field of Classification Search
CPC ......... G06F 3/041; G06F 3/045; G01R 27/26; G06K 11/06; G08C 21/00
See application file for complete search history.

(56) References Cited

U.S. PATENT DOCUMENTS

2010/0097366 A1* 4/2010 Kitayama ............ G09G 3/3614
345/213
2016/0202835 A1* 7/2016 Mizuhashi .......... G02F 1/13306
345/174
(Continued)

FOREIGN PATENT DOCUMENTS

CN           105260067 A    1/2016
CN           105278778 A    1/2016
(Continued)

*Primary Examiner* — Pegeman Karimi
(74) *Attorney, Agent, or Firm* — Andrew C. Cheng (57) ABSTRACT

The disclosure discloses an elimination method of parasitic capacitance and a device. During a touch scanning period, inputting a first simulation signal to source electrode lines and inputting a second simulation signal to multiplex lines can eliminate parasitic capacitance. Waveforms of the first simulation signal and a touch scanning signal input in a common electrode are identical or similar, waveforms of the second simulation signal and the touch scanning signal input in the common electrode are similar, waveforms of the third simulation signal and the touch scanning signal input in the common electrode are similar, a second simulation waveform includes a first target high level, a second target high level, a first target low level and a second target low level that are generated by different modules, the first target high level>the second target high level>the first target low level>the second target low level.

10 Claims, 6 Drawing Sheets

(51) Int. Cl.
*G06F 3/044* (2006.01)
*G09G 3/36* (2006.01)

(52) U.S. Cl.
CPC ......... *G06F 3/0412* (2013.01); *G09G 3/3677* (2013.01); *G09G 3/3696* (2013.01); *G09G 3/3655* (2013.01); *G09G 2320/0223* (2013.01)

(56) References Cited

U.S. PATENT DOCUMENTS

2017/0090630 A1* 3/2017 Kim ................. G06F 3/0412
2017/0344787 A1* 11/2017 Cho ................. G06F 3/0416

FOREIGN PATENT DOCUMENTS

| CN | 105302391 A | 2/2016 |
|---|---|---|
| CN | 105575354 A | 5/2016 |

* cited by examiner

ELIMINATION METHOD OF PARASITIC CAPACITANCE AND DEVICE

CROSS REFERENCE

This disclosure claims priority to Chinese patent application No. 201610628812.X, entitled "ELIMINATION METHOD OF PARASITIC CAPACITANCE AND DEVICE" filed on Aug. 3, 2016, which is incorporated by reference in its entirety.

FIELD OF THE DISCLOSURE

The disclosure relates to a touch screen panel technical field, and more particularly to an elimination method of parasitic capacitance and a device.

BACKGROUND OF THE DISCLOSURE

As the display technology is developing rapidly, a touch screen panel has been gradually infiltrated in human life. At present, touch screen panels can be divided into an add on mode touch panel and an in cell touch panel according to the compositional structure. The add on mode touch panel is producing a touch screen panel and a liquid crystal display (LCD) separately, then attaching them together to be a liquid crystal display with the touch function, but disadvantages such as low transmittance and a relative thick module exist. Yet the in cell touch panel is a sensor of the touch screen panel embedded in the liquid crystal display to reduce the thickness of the entire module and increase the transmittance, which is preferred by various panel manufacturers.

A conventional in-cell touch technology includes a hybrid in-cell touch technique and a full in-cell touch technique. A full in-cell touch panel is more popular due to its simpler structure. However, the full in-cell touch panel has parasitic capacitance that can affect an input touch scanning signal during touch scanning and reduce a signal-to-noise ratio during touch scanning.

SUMMARY OF THE DISCLOSURE

Embodiments of the disclosure provide an elimination method of parasitic capacitance and a device to reduce influence of the parasitic capacitance in a full in-cell touch panel on an input touch scanning signal.

First, the elimination method of parasitic capacitance is provided. The touch display panel includes a plurality of gate lines, a plurality of source electrode lines, a plurality of common electrode lines, a plurality of multiplex lines, an extension direction of the plurality of common electrode lines and an extension direction of the source electrode lines are parallel. A common electrode includes a plurality of sensor pads, the common electrode is multiplexed to be a touch driving electrode, the plurality of common electrode lines are connected to the plurality of sensor pads respectively. The multiplex lines are connected to the plurality of gate lines respectively. A scanning cycle includes a display scanning period and a touch scanning period.

During the touch scanning period, inputting a first simulation signal to the plurality of source electrode lines, inputting a second simulation signal to the plurality of multiplex lines and inputting a third simulation signal to the plurality of gate lines eliminate parasitic capacitance formed among the plurality of gate lines, the plurality of source electrode lines, the plurality of common electrode lines and the plurality of sensor pads.

A waveform of the first simulation signal and a waveform of a scanning signal input in the common electrode are similar, a waveform of the second simulation signal and the waveform of the scanning signal input in the common electrode are similar, a waveform of the third simulation signal and the waveform of the scanning signal input in the common electrode are similar.

Optionally, the waveform of the second simulation signal includes a first target high level and a second target high level, the waveform of the second simulation signal includes a first target low level and a second target low level. The first target high level and the second target high level are generated by different VGH modules, the first target low level and the second target low level are generated by different VGL modules.

Optionally, the first target high level is generated by a first VGH module, the second target high level is generated by a second VGH module, the first target low level is generated by a first VGL module, the second target low level is generated by a second VGL module.

Optionally, the first target high level>the second target high level>the first target low level>the second target low level.

Optionally, the waveform of the first simulation signal and the waveform of the scanning signal input in the common electrode are identical.

Second, an elimination device of parasitic capacitance is provided. The touch display panel includes a plurality of gate lines, a plurality of source electrode lines, a plurality of common electrode lines, a plurality of multiplex lines, an extension direction of the plurality of common electrode lines and an extension direction of the source electrode lines are parallel. A common electrode includes a plurality of sensor pads, the common electrode is multiplexed to be a touch driving electrode, the plurality of common electrode lines are connected to the plurality of sensor pads respectively. The multiplex lines are connected to the plurality of gate lines respectively. A scanning cycle includes a display scanning period and a touch scanning period. The device includes a first input module, a second input module and a third input module.

The first input module is configured to input a first simulation signal to the plurality of source electrode lines during the touch scanning period. The second input module is configured to input a second simulation signal to the plurality of multiplex lines. The third input module is configured to input a third simulation signal to the plurality of gate lines. Which eliminate parasitic capacitance formed among the plurality of gate lines, the plurality of source electrode lines, the plurality of common electrode lines and the plurality of sensor pads.

A waveform of the first simulation signal and a waveform of a scanning signal input in the common electrode are similar, a waveform of the second simulation signal and the waveform of the scanning signal input in the common electrode are similar, a waveform of the third simulation signal and the waveform of the scanning signal input in the common electrode are similar.

Optionally, the waveform of the second simulation signal includes a first target high level and a second target high level. The waveform of the second simulation signal includes a first target low level and a second target low level. The first target high level and the second target high level are generated by different VGH modules, the first target low level and the second target low level are generated by different VGL modules.

Optionally, the first target high level is generated by a first VGH module, the second target high level is generated by a second VGH module, the first target low level is generated by a first VGL module, the second target low level is generated by a second VGL module.

Optionally, the first target high level>the second target high level>the first target low level>the second target low level.

Optionally, the waveform of the first simulation signal and the waveform of the scanning signal input in the common electrode are identical.

In embodiments of the disclosure, inputting the first simulation signal with a waveform similar to the touch scanning signal input in the common electrode to the plurality of source electrode lines, inputting the second simulation signal with a waveform similar to the touch scanning signal input in the common electrode to the plurality of multiplex lines and inputting the third simulation signal with a waveform similar to the touch scanning signal input in the common electrode to the plurality of gate lines can reduce influence of parasitic capacitance in a full in-cell touch panel on the input touch scanning signal.

BRIEF DESCRIPTION OF THE DRAWINGS

In order to more clearly illustrate embodiments of the disclosure, following figures described in embodiments will be briefly introduced, it is obvious that the drawings are merely some embodiments of the disclosure, a person skilled in the art can obtain other figures according to these figures without creativity.

DETAILED DESCRIPTION OF PREFERRED EMBODIMENTS

Figure 1:
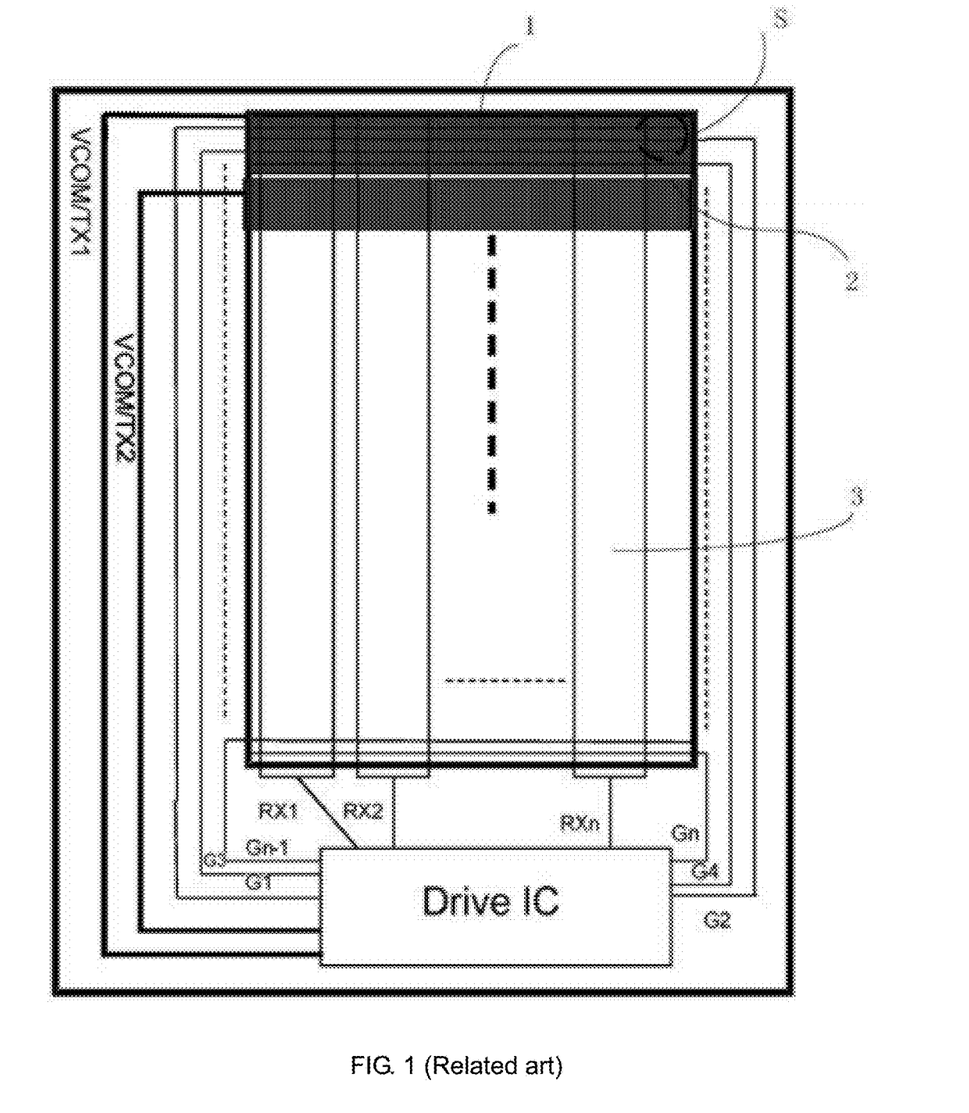
FIG. 1 is a schematic, structural view of a touch display panel of an in cell touch panel disclosed by the prior art.
Figure 2:
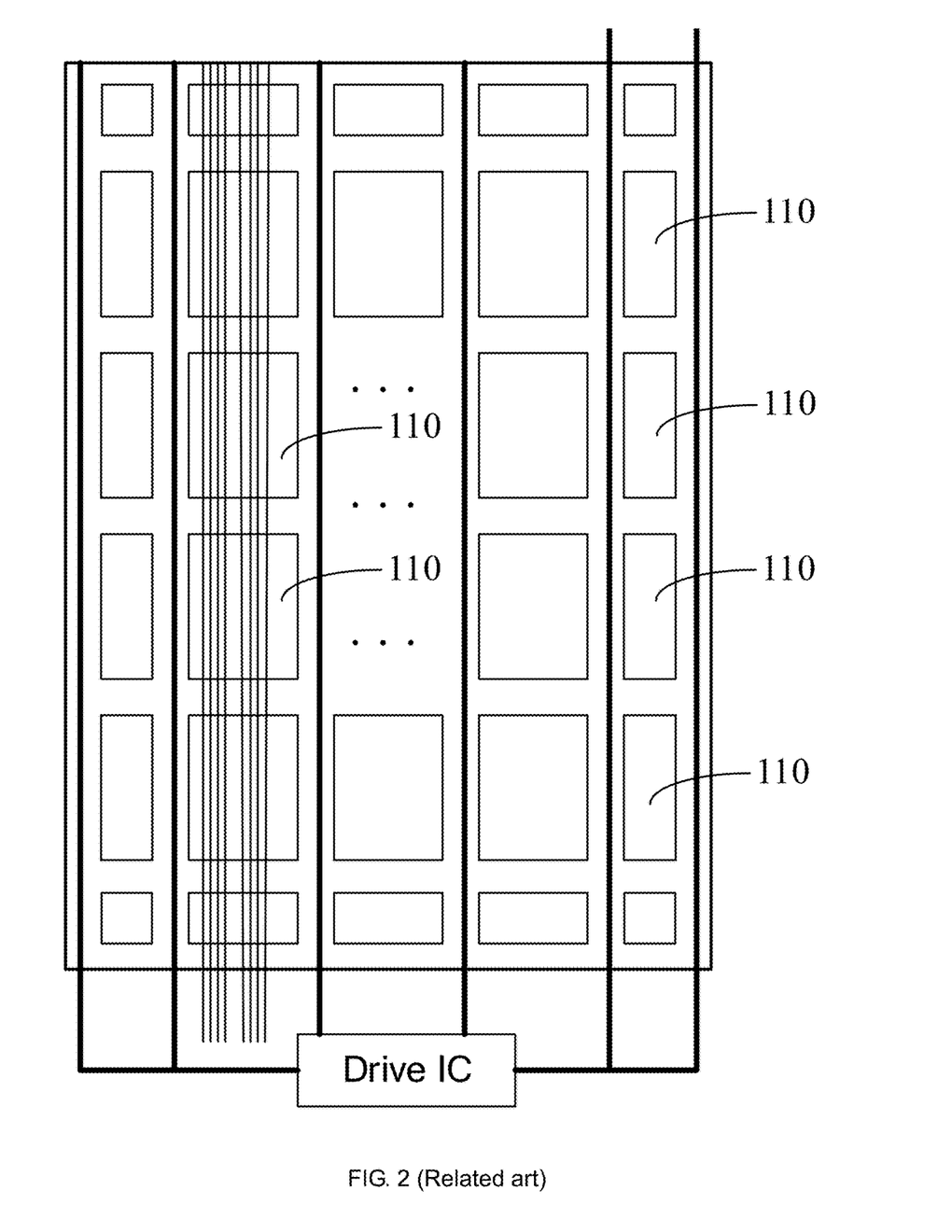
FIG. 2 is a schematic view of sensor pads in a full in-cell touch panel according to the prior art.

The disclosure firstly introduce a structure of an in cell touch panel and a scanning manner for convenience of comprehension. Referring to FIG. 1, FIG. 1 is a schematic, structural view of a touch display panel of an in cell touch panel disclosed by the prior art. The touch display panel shown in FIG. 1 includes a drive IC, a plurality of gate lines 1, a plurality of source electrode lines (not shown in the figure), a plurality of common electrode lines 2, a plurality of multiplex lines (not shown in the figure), an extension direction of the plurality of common electrode lines and an extension direction of the source electrode lines are parallel, as shown in FIG. 2, a common electrode on a side of a module is divided in a plurality of sensor pads 110, the plurality of common electrode lines 2 are connected to the plurality of sensor pads 110 respectively, the plurality of multiplex lines are connected to the plurality of gate lines 1 respectively.

The common electrode is generally multiplexed to be a touch driving electrode for reducing the entire thickness of the module. Therefore, a scanning cycle is at least divided in a display scanning period and a touch scanning period to achieve a display function and a touch function simultaneously. During the display scanning period, the drive IC inputs a display scanning signal to the plurality of gate lines 1 and inputs a VCOM voltage to the sensor pads 110, the display scanning is ran with coordination of the display scanning signal and the VCOM voltage. During the touch scanning period, the drive IC inputs a touch scanning signal to a plurality of touch sensing electrodes and inputs a pulsed voltage to the sensor pads 110, the touch scanning is ran with coordination of the touch scanning signal and the pulsed voltage.

Figure 3:
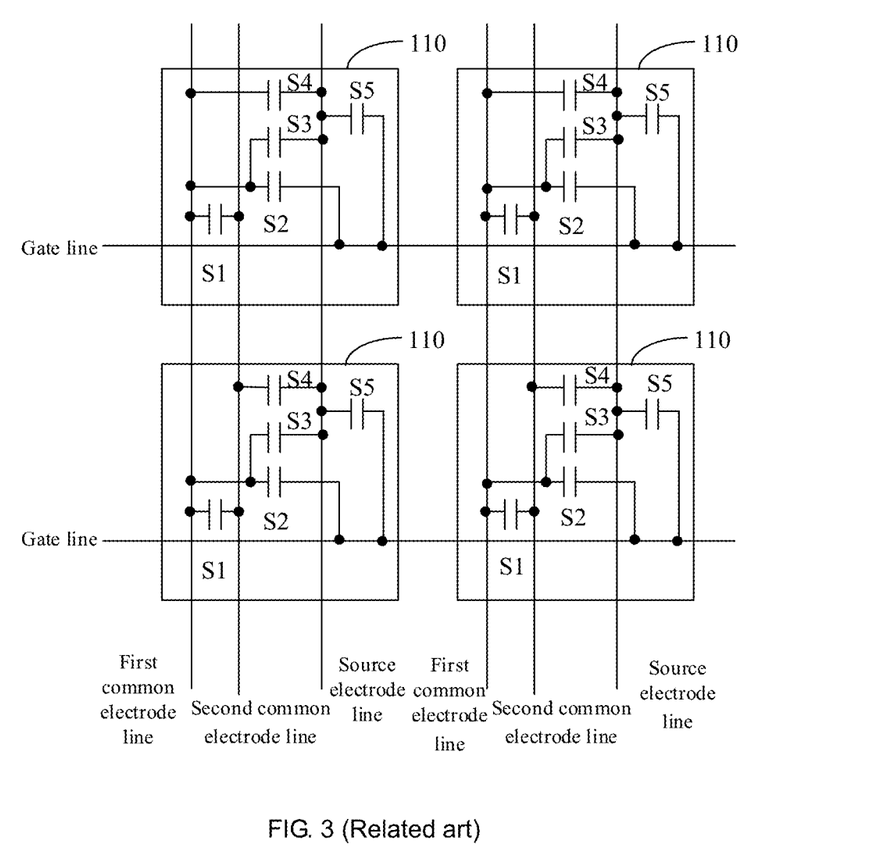
FIG. 3 is an equivalent circuit diagram of parasitic capacitance in the full in-cell touch panel according to the prior art.

However, as two adjacent pieces of metal can form a capacitor, an equivalent circuit diagram formed between two of the gate line, a first common electrode line, a second common electrode line and the source electrode line is shown as FIG. 3. One of the sensor pads 110 is taken as an example, capacitance between the first common electrode line and the second common electrode line can be equal to capacitance S1, capacitance between the first common electrode line and the gate line can be equal to S2, capacitance between the first common electrode line and the source electrode line can be equal to S3, capacitance between the second common electrode line and the source electrode line can be equal to S4, capacitance between the gate line and the source electrode line can be equal to S5. As existence of capacitance S1 to S5, during inputting a pulse-shaped touch scanning voltage to the sensor pad 110, voltages input to the gate line and the source electrode line are both direct voltages, which can cause a charging and discharging effect of capacitance to affect the input touch scanning signal during touch scanning and reduce a signal-to-noise ratio during touch scanning.

The embodiment of the disclosure provides an elimination method of parasitic capacitance to solve the problem above. The method includes during the touch scanning period inputting a first simulation signal to the plurality of source electrode lines, inputting a second simulation signal to the plurality of multiplex lines and inputting a third simulation signal to the plurality of gate lines for eliminating parasitic capacitance formed between two of the plurality of gate lines, the plurality of source electrode lines, the plurality of common electrode lines and the plurality of sensor pads. A waveform of the first simulation signal and a waveform of a touch scanning signal input in the common electrode are similar, a waveform of the second simulation signal and the waveform of the touch scanning signal input in the common electrode are similar, a waveform of the third simulation signal and the waveform of the touch scanning signal input in the common electrode are similar.

The first simulation signal, the second simulation signal and the third simulation signal being all similar to the touch scanning signal input to the common electrode indicates when the pulse-shaped touch scanning signal is a high level, the first simulation signal, the second simulation signal and the third simulation signal will also be the high level, when the pulse-shaped touch scanning signal is a low level, the first simulation signal, the second simulation signal and the third simulation signal will also be the low level. It can be comprehensible that when the first simulation signal, the second simulation signal, the third simulation signal and the touch scanning signal are the high levels (or low levels), voltage differences between two of the gate line, the first common electrode line, the second common electrode line and the source electrode line will be decreased to reduce the charging and discharging effects of the parasitic capacitance S1 to S5 between two of the gate line, the first common electrode line, the second common electrode line and the source electrode line.

Figure 4:
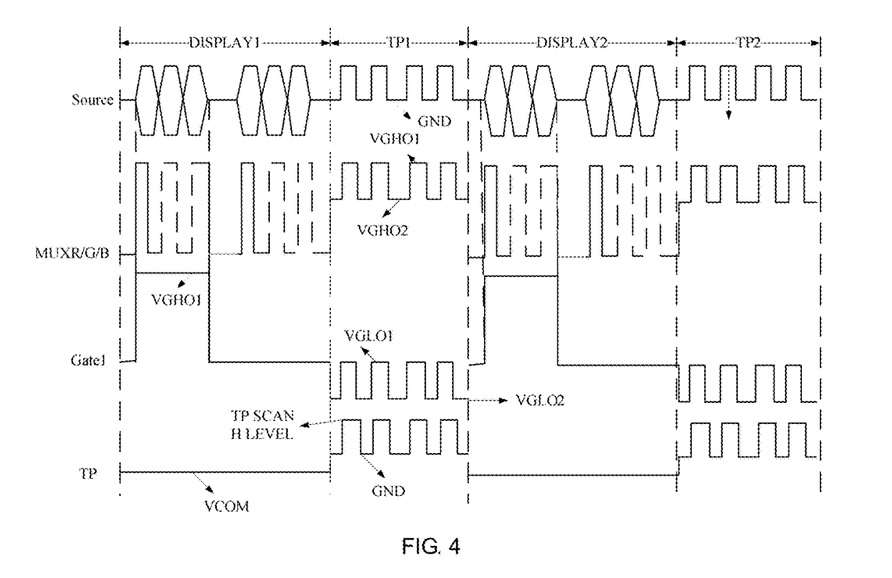
FIG. 4 is a sequence diagram of inputting a first simulation signal, a second simulation signal and a third simulation signal in an elimination method of parasitic capacitance according to an embodiment of the disclosure.

In a practical embodiment, during the touch scanning period, an initial direct voltage on the plurality of source electrode lines is zero, therefore, the drive IC inputs the first simulation signal with a voltage identical to the touch scanning signal to the source electrode lines. An initial voltage on the plurality of multiplex lines is VGH, therefore, the second simulation signal inputting from the drive IC to the multiplex lines includes a first target high level and a second target high level, where the first target high level is higher than the second target high level, moreover, a value of the first target high level and that of the second target high level have no significant difference compared with a value of the VGH voltage. An initial voltage on the gate lines is VGL, therefore, the third simulation signal inputting from the drive IC to the gate lines includes a first target low level and a second target low level, where the first target low level is higher than the second target low level, moreover, a value of the first target low level and that of the second target low level have no significant difference compared with a value of the VGL voltage. In some circumstances, the second target high level can be higher than the first target low level.

Figure 5:
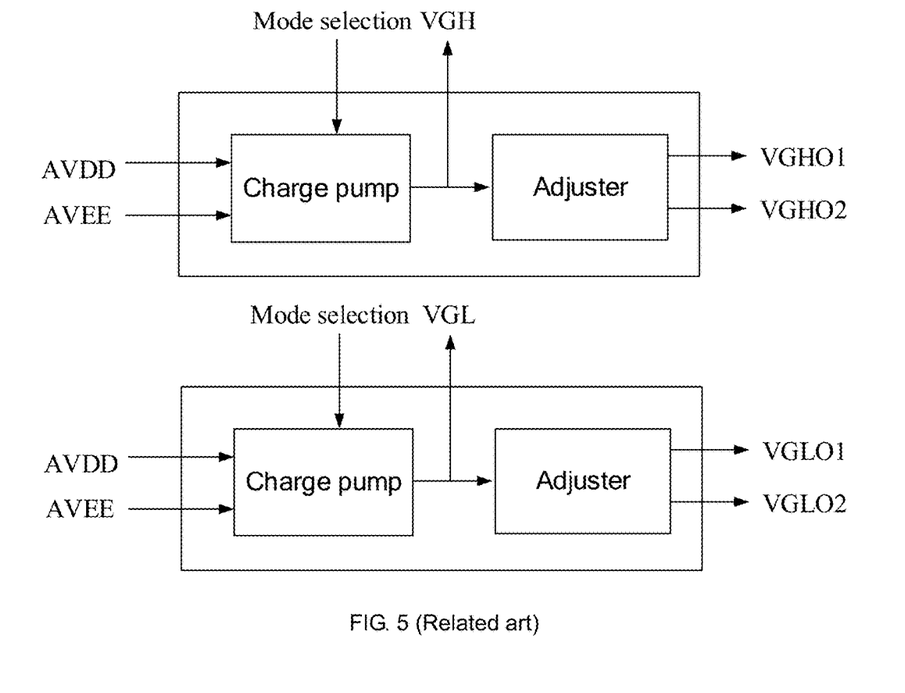
FIG. 5 is a schematic structural view of modules generating a first target high level, a second target high level, a first target low level and a second target low level according to the prior art.

As shown in FIG. 5, in a conventional technique, a module merely has one VGH module and one VGL module, however, the conventional VGH module and VGL module both have a multiplex output function. Various voltages can be output via various paths by selecting various modes. Therefore, the VGH module can generate the first target high level and the second target high level, the VGL module can generate the first target low level and the second target low level.

Figure 6:
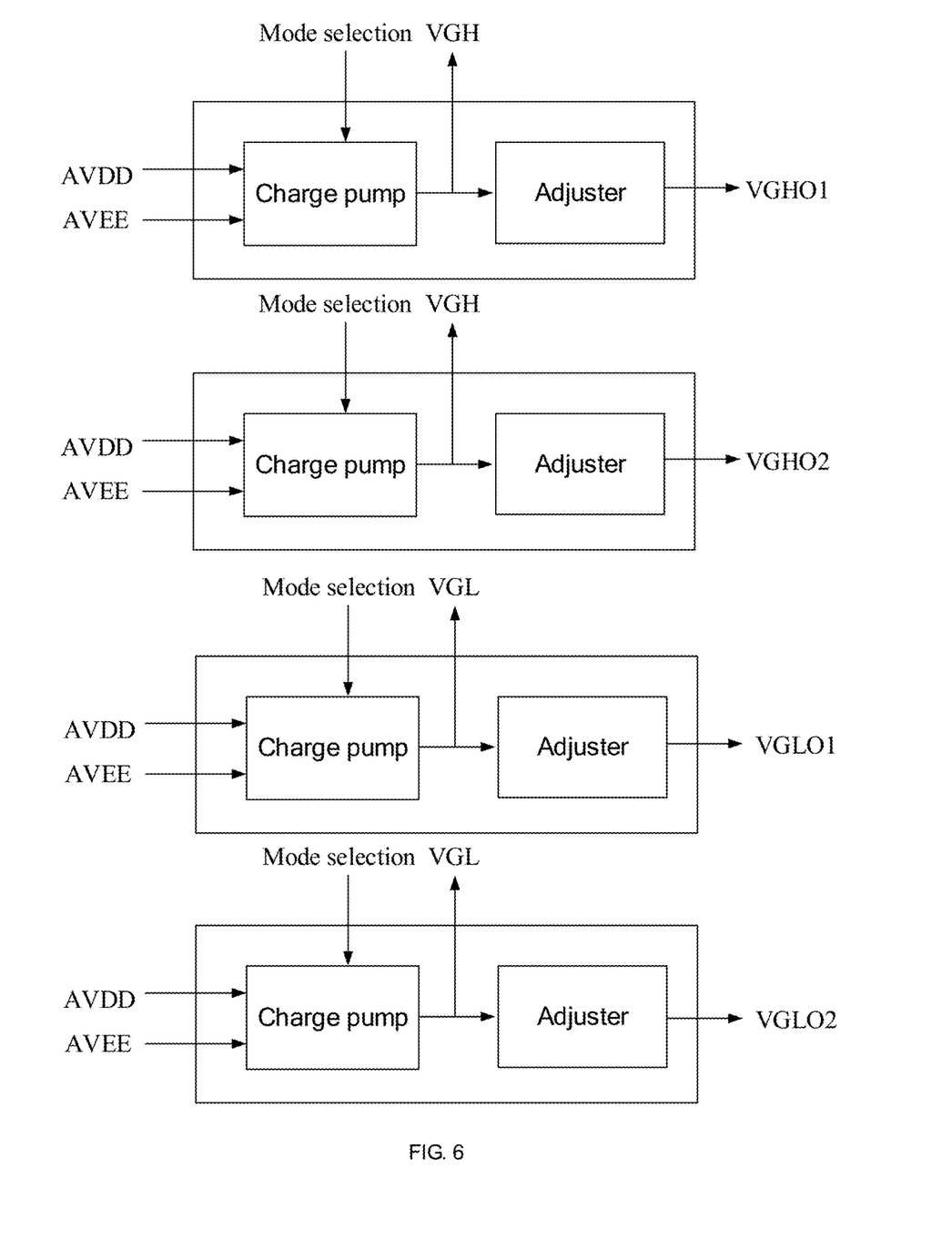
FIG. 6 is a schematic structural view of modules generating a first target high level, a second target high level, a first target low level and a second target low level according to an embodiment of the disclosure.

However, conversion efficiency of the voltage is low according to the manner above, therefore, in order to boost voltage conversion efficiency, the first target high level and the second target high level can be generated by various VGH modules, the first target low level and the second target low level can be generated by various VGL modules. For instance, as shown in FIG. 6, the module is disposed with two VGH modules containing a first VGH module and a second VGH module, also disposed with two VGL modules containing a first VGL module and a second VGL module. The first target high level is generated by the first VGH module, the second target high level is generated by the second VGH module, the first target low level is generated by the first VGL module, the second target low level is generated by the second VGL module. Generating the first target high level and the second target high level by various VGH modules and generating the first target low level and the second target low level by various VGL modules can improve efficiency of converting voltages efficiently.

The embodiment of the disclosure has been described in detail above, a device will be provided as follows to better implement the embodiment of the disclosure above correspondingly.

Figure 7:
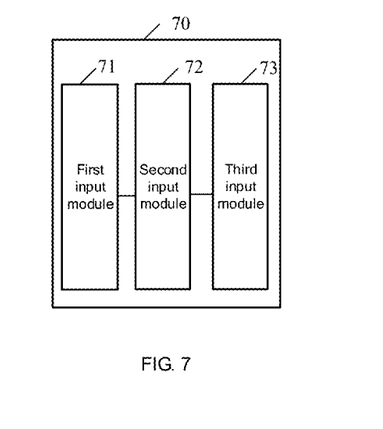
FIG. 7 is a schematic structural view of an elimination device of parasitic capacitance according to an embodiment of the disclosure.

Referring to FIG. 7, FIG. 7 provides an elimination device of parasitic capacitance. A device 70 of the embodiment includes a plurality of gate lines, a plurality of source electrode lines, a plurality of common electrode lines, a plurality of multiplex lines, an extension direction of the plurality of common electrode lines and an extension direction of the source electrode lines are parallel. A common electrode includes a plurality of sensor pads, the common electrode is multiplexed to be a touch driving electrode, the plurality of common electrode lines are connected to the plurality of sensor pads respectively. The plurality of multiplex lines are connected to the plurality of gate lines respectively. A scanning cycle includes a display scanning period and a touch scanning period. The device 70 includes a first input module 71, a second input module 72 and a third input module 73.

The first input module 71 is configured to input the first simulation signal to the plurality of source electrode lines during the touch scanning period. The second input module 72 is configured to input the second simulation signal to the plurality of multiplex lines. The third input module 73 is configured to input the third simulation signal to the plurality of gate lines. Which eliminate parasitic capacitance formed between two of the plurality of gate lines, the plurality of source electrode lines, the plurality of common electrode lines and the plurality of sensor pads. A waveform of the first simulation signal and a waveform of a scanning signal input in the common electrode are similar, a waveform of the second simulation signal and the waveform of the scanning signal input in the common electrode are similar, a waveform of the third simulation signal and the waveform of the scanning signal input in the common electrode are similar.

Optionally, the waveform of the second simulation signal includes a first target high level and a second target high level. The waveform of the second simulation signal includes a first target low level and a second target low level. The first target high level and the second target high level are generated by different VGH modules, the first target low level and the second target low level are generated by different VGL modules.

Optionally, the first target high level is generated by a first VGH module, the second target high level is generated by a second VGH module, the first target low level is generated by a first VGL module, the second target low level is generated by a second VGL module.

Optionally, the first target high level>the second target high level>the first target low level>the second target low level.

Optionally, the waveform of the first simulation signal and the waveform of the scanning signal input in the common electrode are identical.

In embodiments of the disclosure, inputting the first simulation signal with a waveform similar to the touch scanning signal input in the common electrode to the plurality of source electrode lines, inputting the second simulation signal with a waveform similar to the touch scanning signal input in the common electrode to the plurality of multiplex lines and inputting the third simulation signal with a waveform similar to the touch scanning signal input in the common electrode to the plurality of gate lines can reduce influence of parasitic capacitance in a full in-cell touch panel on the input touch scanning signal.

It is understandable in practical to a person skilled in the art that all or portion of the processes in the method according to the aforesaid embodiment can be accomplished with the computer program to instruct the related hardware. The program can be stored in a readable storage medium of a computer. When the program is executed, the processes of the embodiments in the aforesaid respective methods can be included. The storage medium can be a disk, a compact disc, a Read-Only Memory (ROM) or a Random Access Memory (RAM).

Above are merely preferred embodiments of the disclosure, which do not limit the protection scope of the disclosure. A person skilled in the art can understand and achieve all or portion of the processes of the aforesaid embodiments to obtain equivalent replacements that should be covered by the protected scope of the disclosure as well.

What is claimed is:

1. An elimination method of parasitic capacitance, wherein the touch display panel comprises a plurality of gate lines, a plurality of source electrode lines, a plurality of common electrode lines, a plurality of multiplex lines, an extension direction of the plurality of common electrode lines and an extension direction of the source electrode lines are parallel, a common electrode comprises a plurality of sensor pads, the common electrode is multiplexed to be a touch driving electrode, the plurality of common electrode lines are connected to the plurality of sensor pads respectively, the plurality of multiplex lines are connected to the plurality of gate lines respectively, a scanning cycle comprises a display scanning period and a touch scanning period, during the touch scanning period, inputting a first simulation signal to the plurality of source electrode lines, inputting a second simulation signal to the plurality of multiplex lines and inputting a third simulation signal to the plurality of gate lines for eliminating parasitic capacitance formed among the plurality of gate lines, the plurality of source electrode lines, the plurality of common electrode lines and the plurality of sensor pads;

wherein a waveform of the first simulation signal and a waveform of a scanning signal input in the common electrode are similar, a waveform of the second simulation signal and the waveform of the scanning signal input in the common electrode are similar, a waveform of the third simulation signal and the waveform of the scanning signal input in the common electrode are similar.

2. The method according to claim 1, wherein the waveform of the second simulation signal comprises a first target high level and a second target high level, the waveform of the second simulation signal comprises a first target low level and a second target low level, the first target high level and the second target high level are generated by different VGH modules, the first target low level and the second target low level are generated by different VGL modules.

3. The method according to claim 2, wherein the first target high level is generated by a first VGH module, the second target high level is generated by a second VGH module, the first target low level is generated by a first VGL module, the second target low level is generated by a second VGL module.

4. The method according to claim 2, wherein the first target high level>the second target high level>the first target low level>the second target low level.

5. The method according to claim 1, wherein the waveform of the first simulation signal and the waveform of the scanning signal input in the common electrode are identical.

6. An elimination device of parasitic capacitance, wherein the touch display panel comprises a plurality of gate lines, a plurality of source electrode lines, a plurality of common electrode lines, a plurality of multiplex lines, an extension direction of the plurality of common electrode lines and an extension direction of the source electrode lines are parallel, a common electrode comprises a plurality of sensor pads, the common electrode is multiplexed to be a touch driving electrode, the plurality of common electrode lines are connected to the plurality of sensor pads respectively, the plurality of multiplex lines are connected to the plurality of gate lines respectively, a scanning cycle comprises a display scanning period and a touch scanning period, the device comprises a first input circuit, a second input circuit and a third input circuit, a first input circuit being configured to input a first simulation signal to the plurality of source electrode lines during the touch scanning period, the second input circuit being configured to input a second simulation signal to the plurality of multiplex lines, the third input circuit being configured to input a third simulation signal to the plurality of gate lines, so as to eliminate parasitic capacitance formed among the plurality of gate lines, the plurality of source electrode lines, the plurality of common electrode lines and the plurality of sensor pads;

wherein a waveform of the first simulation signal and a waveform of a scanning signal input in the common electrode are similar, a waveform of the second simulation signal and the waveform of the scanning signal input in the common electrode are similar, a waveform of the third simulation signal and the waveform of the scanning signal input in the common electrode are similar.

7. The device according to claim 6, wherein the waveform of the second simulation signal comprises a first target high level and a second target high level, the waveform of the second simulation signal comprises a first target low level and a second target low level, the first target high level and the second target high level are generated by different VGH modules, the first target low level and the second target low level are generated by different VGL modules.

8. The device according to claim 7, wherein the first target high level is generated by a first VGH module, the second target high level is generated by a second VGH module, the first target low level is generated by a first VGL module, the second target low level is generated by a second VGL module.

9. The device according to claim 8, wherein the first target high level>the second target high level>the first target low level>the second target low level.

10. The device according to claim 7, wherein the waveform of the first simulation signal and the waveform of the scanning signal input in the common electrode are identical.

* * * * *